No. 720,903. PATENTED FEB. 17, 1903.
T. W. EATON.
BRAKE MECHANISM FOR ELECTRIC ELEVATORS.
APPLICATION FILED MAR. 26, 1901.
NO MODEL. 3 SHEETS—SHEET 1.
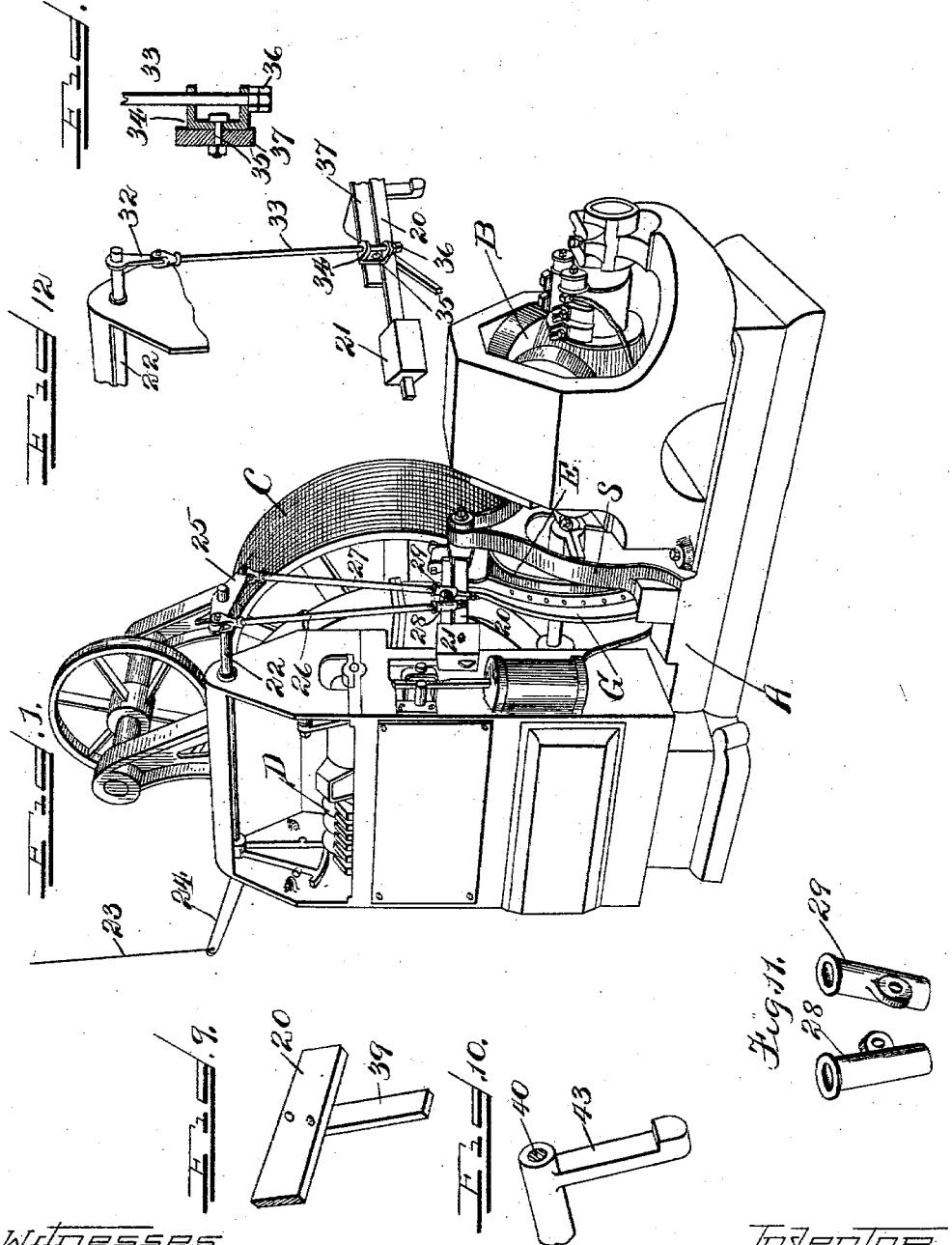

No. 720,903. PATENTED FEB. 17, 1903.
T. W. EATON.
BRAKE MECHANISM FOR ELECTRIC ELEVATORS.
APPLICATION FILED MAR. 26, 1901.
NO MODEL. 3 SHEETS—SHEET 2.
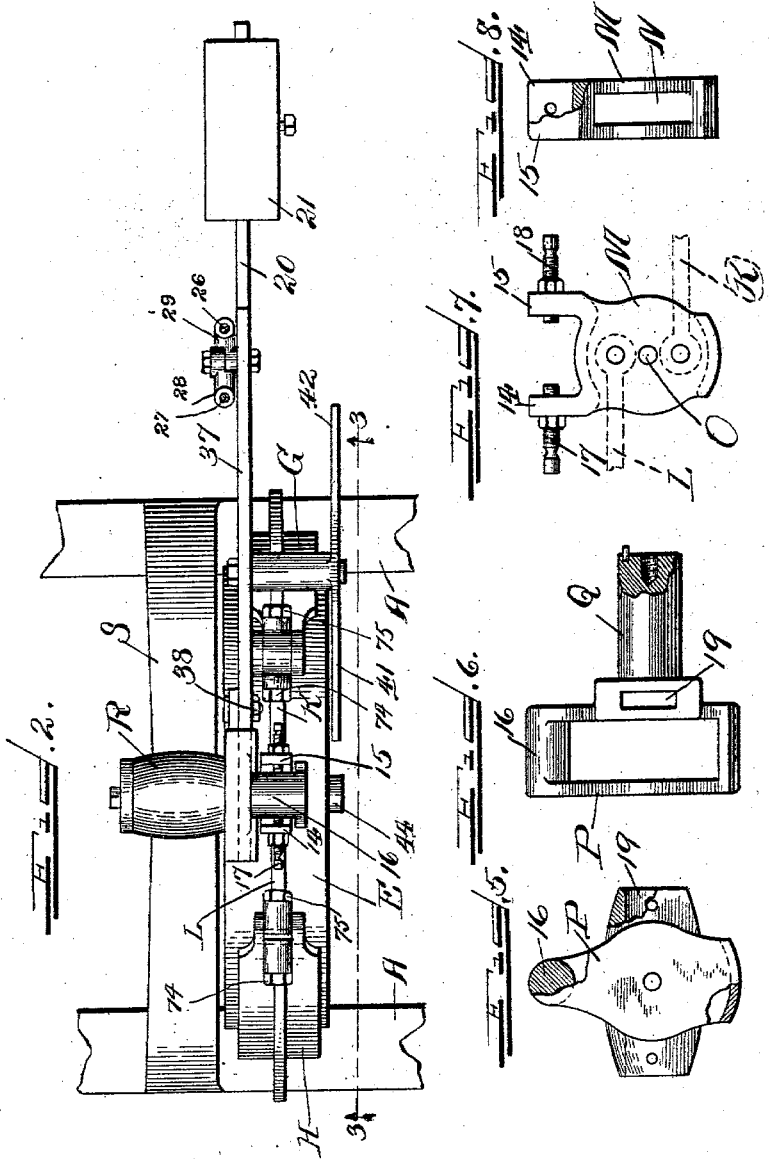

No. 720,903. PATENTED FEB. 17, 1903.
T. W. EATON.
BRAKE MECHANISM FOR ELECTRIC ELEVATORS.
APPLICATION FILED MAR. 26, 1901.
NO MODEL. 3 SHEETS—SHEET 3.
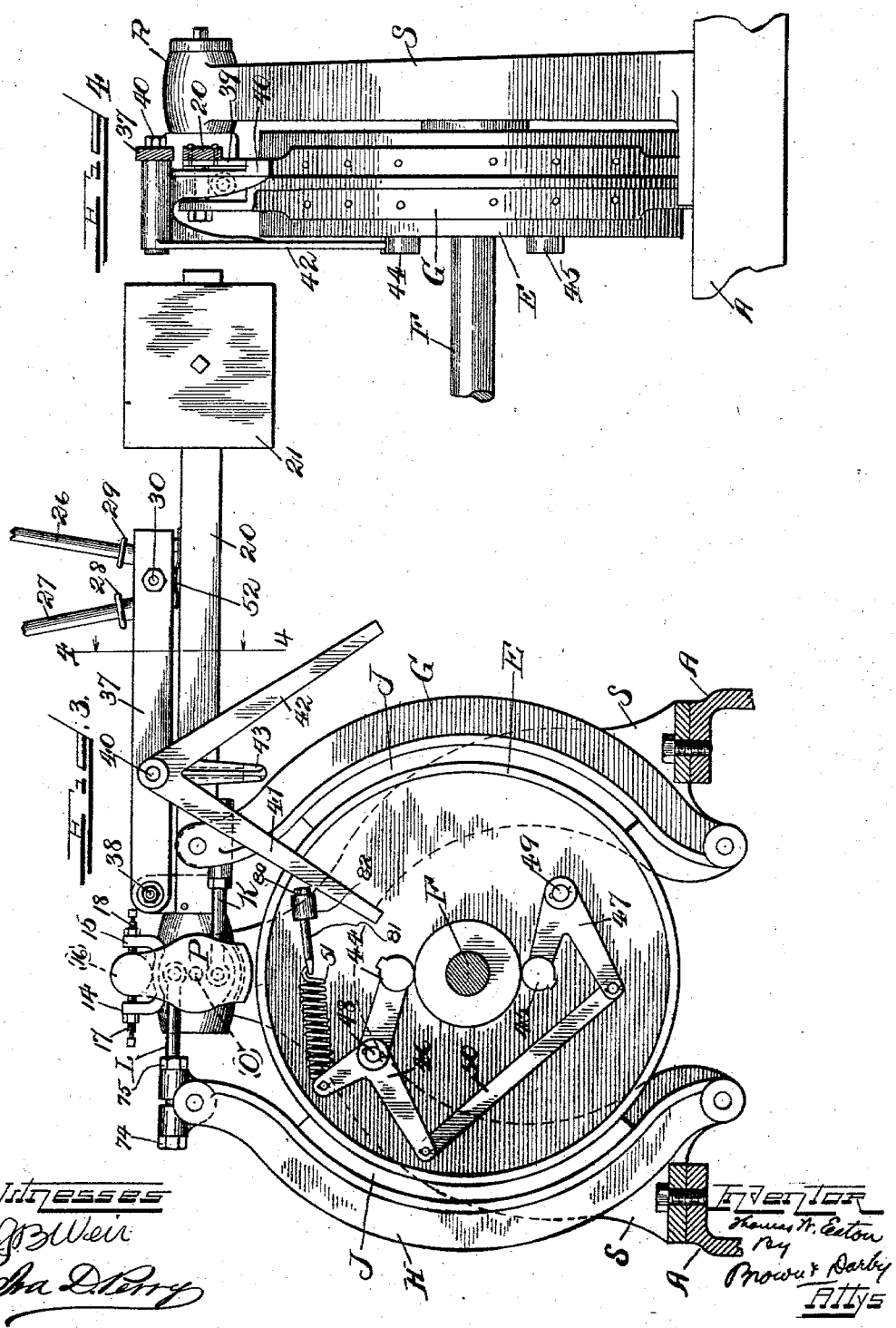

UNITED STATES PATENT OFFICE.

THOMAS W. EATON, OF CHICAGO, ILLINOIS, ASSIGNOR TO EATON & PRINCE COMPANY, OF CHICAGO, ILLINOIS, A CORPORATION OF ILLINOIS.

BRAKE MECHANISM FOR ELECTRIC ELEVATORS.

SPECIFICATION forming part of Letters Patent No. 720,903, dated February 17, 1903.

Application filed March 26, 1901. Serial No. 53,008. (No model.)

*To all whom it may concern:*

Be it known that I, THOMAS W. EATON, a citizen of the United States, residing at Chicago, in the county of Cook and State of Illinois, have invented a new and useful Brake Mechanism for Electric Elevators, of which the following is a specification.

This invention relates to brake mechanism for electric elevators.

The object of the invention is to provide a brake mechanism for electric elevators which is simple in construction and arrangement and efficient in operation.

A further object of the invention is to provide a brake mechanism wherein the brake may be automatically applied.

Other objects of the invention will appear more fully hereinafter.

The invention consists, substantially, in the construction, combination, location, and arrangement, all as will be more fully hereinafter set forth, as shown in the accompanying drawings, and finally pointed out in the appended claims.

Referring to the accompanying drawings, and to the various views and reference-signs appearing thereon, Figure 1 is a view in perspective of an electric-elevator hoisting mechanism, showing the application of a brake construction embodying the principles of my invention. Fig. 2 is a view in top plan, parts being broken off, of a brake mechanism embodying the principles of my invention. Fig. 3 is a side elevation of the same, parts being in transverse section, on the line 3 3, Fig. 2, looking in the direction of the arrows. Fig. 4 is an edge view of the same, parts being in section, on the line 4 4, Fig. 3, looking in the direction of the arrows. Fig. 5 is a detached detail view, parts broken out, of the block or casting in which the brake weight-lever is secured. Fig. 6 is a side elevation of the same. Fig. 7 is a detached detail view of the adjustable yoke which coöperates with the block shown in Figs. 5 and 6. Fig. 8 is an edge view of the construction shown in Fig. 7. Fig. 9 is a detached broken detail view in perspective of the brake weight-lever, showing the locking-arm connected thereto. Fig. 10 is a detached broken detail view in perspective of the hook which coöperates with the locking-arm. Fig. 11 is a broken detail view showing the connection between the brake-operating rods and the brake weight-lever. Fig. 12 is a broken detail view in perspective, showing a modified arrangement of brake-operating rod. Fig. 13 is a broken detail view in section, showing the means of connecting the brake-operating rod of Fig. 12 to the brake weight-lever.

The same part is designated by the same reference-sign wherever it occurs throughout the several views.

In the drawings, A represents the framework of the elevator hoisting mechanism; B, the hoisting-motor; C, the hoisting-drum, and D the main or reversing switch. These parts may be of the usual or any well-known construction, type, or arrangement and in the specific details of construction and arrangement thereof form no part of the present invention.

In the practical operation of electric elevators it is desirable to provide a brake mechanism which gives the greatest degree of braking efficiency. It is also desirable to provide a brake mechanism that may be applied coincidently with the actuation of the main or reversing switch and in whichever direction such switch is actuated. It is also desirable and important to so construct and arrange the brake mechanism that the brake may be applied automatically in case the speed of the motor should for any reason exceed the safety limit.

It is among the objects of my invention to provide a construction and arrangement of brake mechanism wherein the advantages above noted are secured, and in carrying out my invention in a simple and efficient manner I mount a brake-wheel E upon the shaft F of the motor or other convenient rotating part of the elevator hoisting mechanism, and upon the framework of the machine I pivotally mount at one end the brake-levers G H, suitably juxtaposited and arranged to partially encircle the brake-wheel E and each provided with a bearing surface or lining J, arranged when said levers are suitably actuated to engage or bear against the peripheral surface of the brake-wheel, as most clearly shown in Figs. 2, 3, and 4. The free end of each of the brake-levers G H, I pivotally connect in any suitable manner with suitable links K L, the other ends of said links being pivotally connected to a yoke M. The yoke M (see Figs. 7 and 8) is provided with an opening or passage therethrough, as indicated at N, through which the links L K extend. The yoke M is pivotally mounted, as at O, within a block or casting P, and the links L K are pivotally connected to the yoke M on opposite sides of the pivot O on said yoke, as clearly shown. The casting P is provided with a projecting hub Q, arranged to be received in a bearing R, formed in a bracket or standard S or other convenient part of the frame, whereby said casting may be rotated or rocked. The yoke M is provided with ears or lugs 14 15, arranged when said yoke is assembled to straddle or to receive therebetween a portion 16 of block or casting P. Set-screws 17 18 are arranged to be tapped through the ears or lugs 14 15 and to bear against or engage the portion 16 of block or casting P, said set-screws being held in adjusted position by set-nuts or otherwise in any suitable manner. Thus by suitably adjusting said set-screws the yoke M may be rocked about its pivotal support O, thus relatively projecting the links K L in one direction or the other, thereby equalizing and adjusting the bearing of brake-levers G H against the periphery of brake-wheel E. Relative adjustment of the brake-levers G H may also be attained, if desired, by adjustably mounting or connecting the links K L in the ends of said levers. I do not desire, therefore, to be limited in this respect.

The block or casting P is provided with a seat or passage 19 therethrough adapted to receive the end of a lever 20, upon which is adjustably mounted in any suitable or convenient manner a weight 21. This weight and lever constitute the brake-setting mechanism, the weight normally tending to rock the casting or block P or the hub or extension Q thereof in its bearing R, and the rocking movement imparted to block or casting P under the influence of the weight 21 is in a direction to cause the free ends of the brake-levers G H to be drawn together or toward each other, thereby setting or applying the bearing surfaces or shoes J to the peripheral surface of the brake-wheel. In other words, the yoke M, to which the links K L are connected, partakes of any rocking movement imparted to block or casting P, and to this end the pivot-support O of the yoke upon the block or casting P is in axial alinement with the bearing hub or extension Q of said block or casting, and since the adjusting-screws 17 18 when once set prevent relative movement of the yoke and block or casting it will be seen that the rocking movement imparted by the weight 21 to the block or casting P will also be imparted to the yoke and about an axis concentric with the axis of relative rocking adjustment or pivotal support of said yoke, and since the links K L are connected to the yoke on opposite sides of said axis any rocking movement imparted to the yoke will effect a relative endwise movement of said links in one direction or the other, according to the direction of the rocking movement imparted to the yoke, thereby drawing the free ends of the brake-levers G H toward each other to apply the brake shoes or bearings J or else, as the case may be, moving the free ends of said brake-arms away from each other to release the brake.

From the foregoing description it will be seen that the office of the adjusting set-screws 17 18 is to adjust the yoke M relatively to the block or casting upon which said yoke is pivotally supported, thereby compensating for wear of the brake-shoes. The bearing or pressure of the two brake-levers upon the peripheral surface of the brake-wheel is equalized by the adjustable connection of the links K L in the ends of the brake-arms G H and which adjustment is afforded by the set-nuts 74 75.

I will now describe means for actuating lever 20 to set or release the brake mechanism.

Reference-sign 22 designates a rock-shaft, to which rotative or rocking movement may be imparted in any suitable manner from the car—as, for instance, through the hand or car-cable connection 23 and crank-arm 24 or in any other suitable or convenient manner. The rock-shaft 22 may be utilized to effect the operation of the main reversing or controller switch D in any simple or convenient manner.

Referring to Fig. 11, upon the rock-shaft 22 is mounted a lever 25, having the two ends thereof projecting in opposite directions from said shaft. To each end of the lever 25 is connected a rod 26 27. Each rod 26 27 is arranged to operate longitudinally and loosely through sockets or passages formed in castings 28 29. The socket-pieces 28 29 are pivotally mounted upon a common axis or pivot-bolt 30, but capable of independent rocking movement thereon, said pivot-bolt 30 being mounted on or connected to the brake weight-lever 20. Upon the ends of rods 26 27, which project through the socket-pieces 28 29, are carried nuts or shoulders, which, if desired, may be adjusted lengthwise of said rods.

From the foregoing description it will be seen that the rods 26 27 may be projected in one direction freely and without effecting any movement of said socket-pieces; but when projected in the opposite direction the nuts or shoulders carried by the ends of said rods engage the socket-pieces and effect a movement thereof. It will also be seen that in whichever direction from a central position the lever 25 may be rocked one or the other of the rods will effect a raising of the brake weight-lever 20 and a consequent release of the brake-levers G H. The parts are so relatively arranged and adjusted that when shaft 22 occupies a centered position—that is, when the main reversing-switch is in position to break the motor-circuits—the brake-levers G H will be applied under the influence of weight 21, operating through lever 20, as above explained; but when controller-shaft 22 is rocked in one direction or the other to cause the car to ascend or to descend either one or the other of the rods 26 27 will raise the brake weight-lever and release the brake-levers G H, and whichever rod 26 27 is in commission to accomplish this result the other of said rods will slide loosely through its pivot socket-piece.

It is obvious that other forms of means for projecting the rods 26 27 coincidently with the actuation of the main reversing and controlling switch D may be used without departure from the spirit and scope of my invention. I do not desire, therefore, to be limited or restricted to the exact construction shown and described. It is also obvious that other forms of construction for raising the weight-arm 20 coincidently with the actuation of the controller may also be employed. For instance and by way of illustration of a modified arrangement for accomplishing this result, I have shown in Figs. 12 and 13 a construction wherein the shaft 22 is provided with a crank-arm 32, to which is pivotally connected one end of a rod 33, the other end of said rod arranged to slide loosely through perforated flanges in a block or plate 34, pivotally mounted, as at 35, said rod 33 being provided with suitable nuts or shoulders 36. The pivotal connection 35 of block or plate 34 is suitably connected to the weight-arm 20. From this construction it will be seen that when the crank-arm 32 is in dead-center position, as shown in Fig. 12, and which is the position of shaft 22 when the reversing or controller switch is in position to break the motor-circuits, the weight-arm 20 is in its lowermost position, and hence the brake-levers are applied. When, however, shaft 22 is rocked in either direction to actuate the controller or reversing switch and cause the car to ascend or descend, the crank-arm 32 will be rocked from its dead-center position in one direction or the other and when rocked in either direction will cause the weight-arm 20 to be raised to release the brake-levers.

As hereinabove set forth, it is desirable to provide means whereby when for any cause an undue speed of travel of the car is attained the brake may be automatically applied. I have shown a simple and efficient construction for accomplishing this result and which construction I will now proceed to describe. In carrying out this idea instead of connecting the socket-pieces 28 29, through which rods 26 27 operate, or the plate or block 34, through which rod 33 operates, in the constructions above described directly to the weighted arm 20 said socket pieces or blocks are pivotally mounted at the free end of the arm 37, said arm being pivotally connected at the other end thereof to the weighted arm 20 and at a point adjacent to the fulcrum of said weighted arm 20, as indicated at 38. Formed on or otherwise suitably secured to the arm 20 is a lug or projection 39, constituting what I shall term a "locking-arm," and pivotally mounted, as at 40, upon arm 37 and at a point intermediate the pivotal connections 38 and 30 (see Fig. 3) or 38 and 35, in case the construction shown in Figs. 12 and 13 are employed, is a bracket having angle-arms 41 42 and also a depending hook 43, which hook is arranged to engage the locking arm or lug 39 upon brake-arm 20 to hold or support said arm against the tendency of weight 21 to rock said arm. Thus when the parts are properly assembled the auxiliary arm 37 is supported and raised at its free end by the rods 26 27 or the rod 33, as the case may be, and since the bracket carrying the arms 41 42 is connected to said auxiliary arm 37 and since the hook 43, also forming part of said bracket, is in engagement with the lug or holding-arm 39 it will be seen that the brake weight lever or arm 20 is thus supported and raised. However, in case the bracket carrying the arms 41 42 is rocked or swung in one direction or the other about it pivot 40 the hook 43 will be carried out of engaging relation with respect to the projection 39, thereby detaching the coupling between auxiliary arm 37 and weight-arm 20 and permitting the weight to rock said arm 20 and to apply the brakes. The two angle-arms 41 42 serve to hold said bracket normally in position for the hook 43 thereon to occupy engaging relation with respect to the lug or projection 39, as clearly shown in Fig. 3. In order to automatically trip the bracket which carries hook 43 to detach said hook from said lug 39, I arrange one of the arms 41 42 of said bracket to project into the path of centrifugal balls or weights 44 45, said balls or weights being carried upon arms of lever 46 47, pivotally mounted or connected, as at 48 49, upon the face of brake-wheel E or other convenient rotating part. A link 50 connects the arms 46 47. Thus when the speed of rotation of the rotating part upon which the centrifugal balls or weights are mounted unduly increases said balls are projected in the usual manner until finally one or the other of said balls strikes the end of the arm 41 of the bracket, and thereby rocking said arm and bracket effects a disengagement of the hook 43 from the holding arm or projection 39. The outward movement of the centrifugal balls or weights may be opposed in any suitable manner—as, for instance, by means of a spring 51, the tension of which may be adjustably regulated—as, for instance, by means of a set-nut 80, mounted upon the threaded end of a rod 81, arranged to pass loosely through a lug 82, carried by wheel E—one end of spring 51 being connected to said rod and the other end connected to an arm of lever 46. In this manner the automatic brake-tripping mechanism may be set to operate at any desired predetermined speed.

From the foregoing description it will be seen that I provide a simple and efficient construction whereby the brake-levers may be applied automatically where the speed of travel of the car for any cause exceeds a safety limit.

If desired and in order to maintain efficient engagement of the hook 43 with the lug or projection 39 and to prevent accidental disengagement thereof, a spring 52 (see Fig. 3) may be interposed between the auxiliary arm 27 and the weighted lever 20.

It is believed that the operation of the mechanism above described will be fully understood from the foregoing description, taken in connection with the accompanying drawings.

While I have shown and described various specific constructions embodying the principles of my invention, I do not desire to be limited or restricted to the exact details disclosed, as many variations therefrom and changes therein would readily occur to persons skilled in the art and still fall within the spirit and scope of my invention; but, Having now set forth the object and nature of my invention and the best construction in which I have contemplated carrying the same into practical operation and having explained such construction, its purpose, function, and mode of operation, what I claim as new and useful and of my own invention, and desire to secure by Letters Patent, is—

1. In a brake for elevator hoisting mechanism, a brake-wheel, a brake-lever adapted to be applied thereto, a weighted arm for actuating said brake-lever, a support for said arm, a main controlling and reversing switch and mechanical connections between said reversing switch and support whereby when said reversing-switch is moved into position to arrest the motor the support for said weighted arm is released and said brake applied, as and for the purpose set forth.

2. In a brake for elevator hoisting mechanism, the combination with braking devices and means for actuating the same, including a weighted arm, a support therefor, a rod having loose connections with said support, a rock-shaft, means actuated by the rocking movement of said shaft for projecting said rod to raise or release said support, and independent means actuated by excessive speed of movement of the car for automatically releasing said weighted arm, as and for the purpose set forth.

3. In a brake for elevator hoisting mechanism, braking devices, a weighted arm connected thereto and normally operating to apply the brake, a support for said arm, a rod having loose connections with said support, means for controlling the hoisting-motor, actuating devices therefor, and connections between said actuating devices and said rod whereby when said motor-controlling means are actuated to cause the car to travel in either direction said support is raised to release the brake, as and for the purpose set forth.

4. In a brake for elevator hoisting mechanism, a brake-lever, a weighted arm connected thereto and normally operating to apply such brake-lever, a support for said arm, motor-controlling devices including a rock-shaft, oppositely-projecting crank-arms mounted on said shaft, a rod pivotally connected to the free end of each of said crank-arms, each of said rods having loose connections with said support, as and for the purpose set forth.

5. In a brake for elevator hoisting mechanism, a brake-lever, a weighted arm connected thereto for applying and releasing the same, motor-controlling devices including a rock-shaft, a crank-arm carried thereby, a rod pivotally connected at one end to said crank-arm, a block pivotally connected to said weighted arm, the other end of said rod operating loosely through said block, as and for the purpose set forth.

6. In a brake for elevator hoisting mechanism, a brake-wheel, brake-levers arranged to be applied thereto, a weighted arm connected to said levers for applying and releasing the same, motor-controlling mechanism including a rock-shaft, a crank-arm carried by said rock-shaft, a rod pivotally connected at one end to said crank-arm, and a block pivotally connected to said weight-lever through which the other end of said rod loosely passes when said rod is projected in one direction, and a stop or shoulder carried by said rod and adapted to engage said block to raise said weighted arm when said rod is projected in the other direction, as and for the purpose set forth.

7. In a brake for elevator hoisting mechanism, a brake-wheel, a brake-lever arranged to be applied thereto, a weighted arm connected to said lever for applying and releasing the same, blocks pivotally connected upon a common axis to said weighted arm, motor-controlling mechanism including a rock-shaft, crank-arms carried by said shaft and projecting in opposite directions therefrom, a rod pivotally connected to the free end of each of said crank-arms, said rods operating loosely through said blocks when projected in one direction and each carrying stops or shoulders arranged when projected in the opposite direction to engage said blocks to raise said weighted arm, as and for the purpose set forth.

8. In a brake for elevator hoisting mechanism, a brake-wheel, a brake-lever adapted to be applied thereto or released therefrom, a weighted arm for actuating said lever, a rotative fulcrum for said arm, adjustable connections between said rotative fulcrum and said brake-lever, and means for actuating said weighted arm, as and for the purpose set forth.

9. In a brake for elevator hoisting mechanism, a brake-wheel, a brake-lever adapted to be applied thereto and released therefrom, a weighted arm, a rotatable fulcrum therefor, a yoke adjustably pivoted upon said fulcrum, connections between said yoke and lever, and means for actuating said weighted arm, as and for the purpose set forth.

10. In a brake for elevator hoisting mechanism, a brake-wheel, a brake-lever, a weighted arm, a rocking fulcrum for said arm, a yoke pivotally mounted concentric with the axis of said fulcrum, means for rotatively adjusting said yoke and fulcrum, connections between said yoke and brake-lever, and means for actuating said weighted arm, as and for the purpose set forth.

11. In a brake for elevator hoisting mechanism, brake-shoes and means for applying and releasing the same including a weighted arm, a pivoted block or casting for said arm, in combination with a yoke adjustably mounted upon said block or casting, connections between said yoke and brake-shoes, and means for actuating said weighted arm, as and for the purpose set forth.

12. In a brake for elevator hoisting mechanism, brake-shoes, means for applying and releasing the same, including a weighted arm, a pivotally-mounted block or casting to which said arm is connected, a yoke mounted upon said block or casting for adjustment relatively thereto, connections between said yoke and brake-shoes, and means for rocking said weighted arm, as and for the purpose set forth.

13. In a brake for elevator hoisting mechanism, brake-shoes, a weighted arm, a pivotally-mounted block or casting to which said arm is connected, a yoke pivotally mounted upon said block or casting, connections between said yoke and brake-shoes, means for rotatively adjusting said yoke about its pivotal support upon said block or casting, and means for rocking said weighted arm, as and for the purpose set forth.

14. In a brake for elevator hoisting mechanism, a brake-wheel, brake-levers adapted to be applied thereto or released therefrom, a weighted arm, a pivotally-mounted block or casting to which said arm is connected, a yoke pivotally mounted upon said block or casting, links connected to said brake-levers at one end and to said yoke at the other on opposite sides of the pivotal support of said yoke, means for adjustably rocking said yoke about its pivot, and means for rocking said weighted arm, as and for the purpose set forth.

15. In a brake for elevator hoisting mechanism, brake-shoes, a weighted arm, a block or casting to which said arm is connected, a yoke mounted upon said block or casting and connected to said brake-shoes, said yoke provided with ears or extensions, set-screws carried by said ears or extensions and arranged to engage said yoke or casting whereby said yoke may be adjusted upon and with reference to said block or casting, and means for rocking said weighted arm, as and for the purpose set forth.

16. In a brake for elevator hoisting mechanism, a brake-wheel, brake-levers arranged to be applied to said wheel, a pivotally-mounted block or casting, a yoke pivotally mounted upon said block or casting and provided with ears or extensions arranged to straddle a portion of said block or casting, links respectively connected to the ends of said brake-lever and to said yoke on opposite sides of the pivotal support of the latter, set-screws mounted in said ears or extensions and arranged to engage said block or casting in opposite directions, a weighted arm connected to said block or casting, and means for rocking said arm, as and for the purpose set forth.

17. In a brake for elevator hoisting mechanism, brake-shoes, means for actuating the same, including a weighted arm, a lug or projection carried by said arm, a hook arranged to engage said lug or projection to support said arm, a bracket carrying said hook, means for raising and lowering said bracket to apply and release said shoes, and centrifugal devices actuated by the speed of travel of the car arranged to engage said bracket for releasing said hook when the speed exceeds the desired point, as and for the purpose set forth.

18. In a brake for elevator hoisting mechanism, braking devices and means for actuating the same, including a weighted lever, an auxiliary arm pivotally connected to said lever, detachable connections between said arm and lever, manually-actuated devices for raising and lowering said arm to raise and lower said lever, and automatic devices for releasing the connections between said arm and lever independently of said manually-actuated devices, as and for the purpose set forth.

19. In a brake for elevator hoisting mechanism, braking devices and means for actuating the same including a weighted lever, an auxiliary arm pivotally connected to said lever, detachable connections between said arm and lever, a spring interposed between said arm and lever to hold said detachable connections in operative engagement, manually-actuated devices connected to said arm for actuating said lever, and automatic devices for tripping said detachable connections to release said lever independently of said manual devices, as and for the purpose set forth.

20. In a brake for elevator hoisting mechanism, a brake-wheel, brake-levers respectively pivoted on opposite sides of said wheel and so juxtaposited as to partially encircle the same, links connected to the free ends of said levers, a yoke to which said links are connected, and means for rocking said yoke, whereby said brake-levers are applied to or released from said wheel and a weighted arm connected to said yoke, as and for the purpose set forth.

21. In a brake for elevator hoisting mechanism, a brake-wheel, brake-levers respectively pivoted on opposite sides of said wheel and so juxtaposited as to partially encircle the same, links adjustably connected to the free ends of said levers, a yoke to which said links are connected, a weighted arm connected to said yoke and means for rocking said yoke, as and for the purpose set forth.

22. In a brake for elevator hoisting mechanism, a brake-wheel, brake-levers respectively pivoted on opposite sides of said wheel and so juxtaposited as to partially encircle the same, links adjustably connected to the free ends of said levers, a pivotally-mounted block, a yoke pivotally mounted in said brake, and means for relatively adjusting said yoke and block, a weighted arm connected to said block, and means for rocking said block, as and for the purpose set forth.

23. In a brake for elevator hoisting mechanism, braking devices and means for actuating the same including a weighted lever, an auxiliary arm pivotally connected to said lever, detachable connections between said arm and lever, manually-actuated devices for raising and lowering said arm to raise and lower said lever, automatic devices for releasing the connections between said arm and lever independently of said manually-actuated devices, and means for adjusting the point at which said automatic devices operate, as and for the purpose set forth.

24. In a brake for elevator hoisting mechanism, a brake-lever, means for applying and releasing the same including a weighted arm, said arm being provided with a projection, an auxiliary arm, a hook arranged to engage said projection to support said weighted arm, said hook supported on said auxiliary arm manually-actuated devices connected to said auxiliary arm for raising and lowering said weighted arm, centrifugally-actuated devices connected to a rotating part of the hoisting mechanism and arranged to move said hook when the speed exceeds a given limit to detach the same from supporting relation with respect to said projection whereby the brake-lever is automatically applied, as and for the purpose set forth.

25. In a brake for elevator hoisting mechanism, a brake-lever, a weighted arm connected thereto and provided with a projection, an auxiliary arm connected to said weighted arm, bracket-arms supported on said auxiliary arm, and a hook arranged to engage said projection to support said weighted arm, centrifugally-actuated balls connected to a rotating part and arranged when the speed exceeds a given limit to strike a bracket-arm to release said hook, a spring for opposing the centrifugal movements of the balls, and means for adjustably regulating the tension of said spring, as and for the purpose set forth.

In witness whereof I have hereunto set my hand, this 22d day of March, 1901, in the presence of the subscribing witnesses.

THOMAS W. EATON.

Witnesses:
E. C. SEMPLE,
S. E. DARBY.